March 6, 1951     L. C. GROSS     2,544,456
LOW BED VEHICLE
Filed Dec. 14, 1946     2 Sheets-Sheet 1
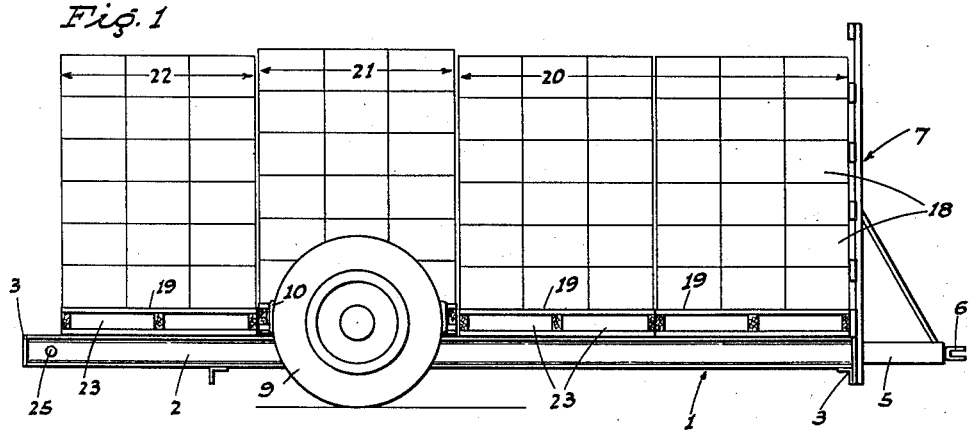
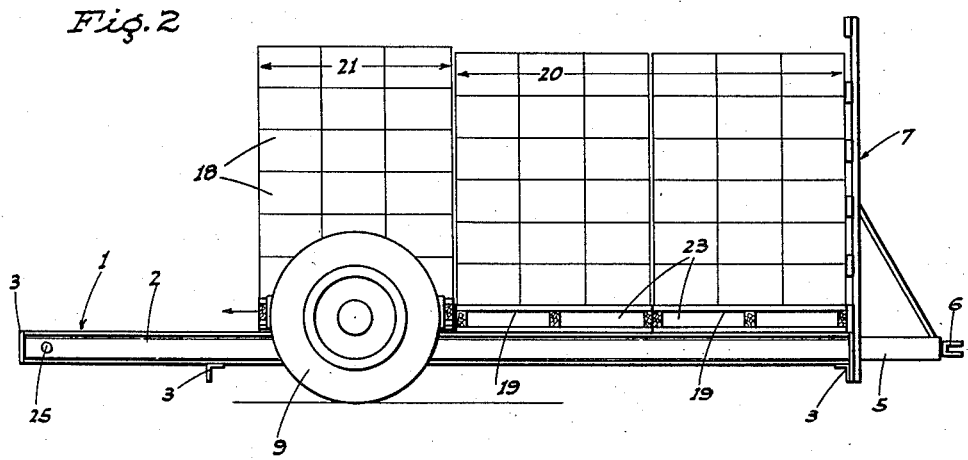
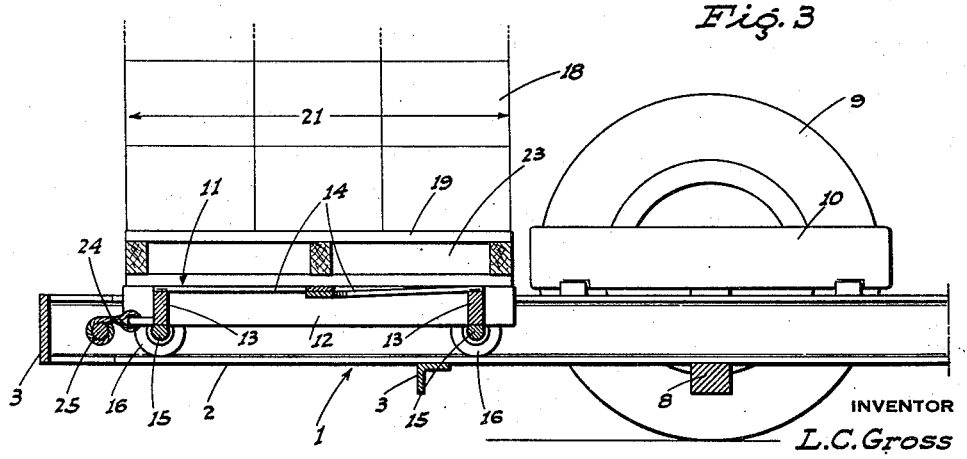
INVENTOR
L. C. Gross
BY
ATTORNEYS March 6, 1951 L. C. GROSS 2,544,456
LOW BED VEHICLE
Filed Dec. 14, 1946 2 Sheets-Sheet 2
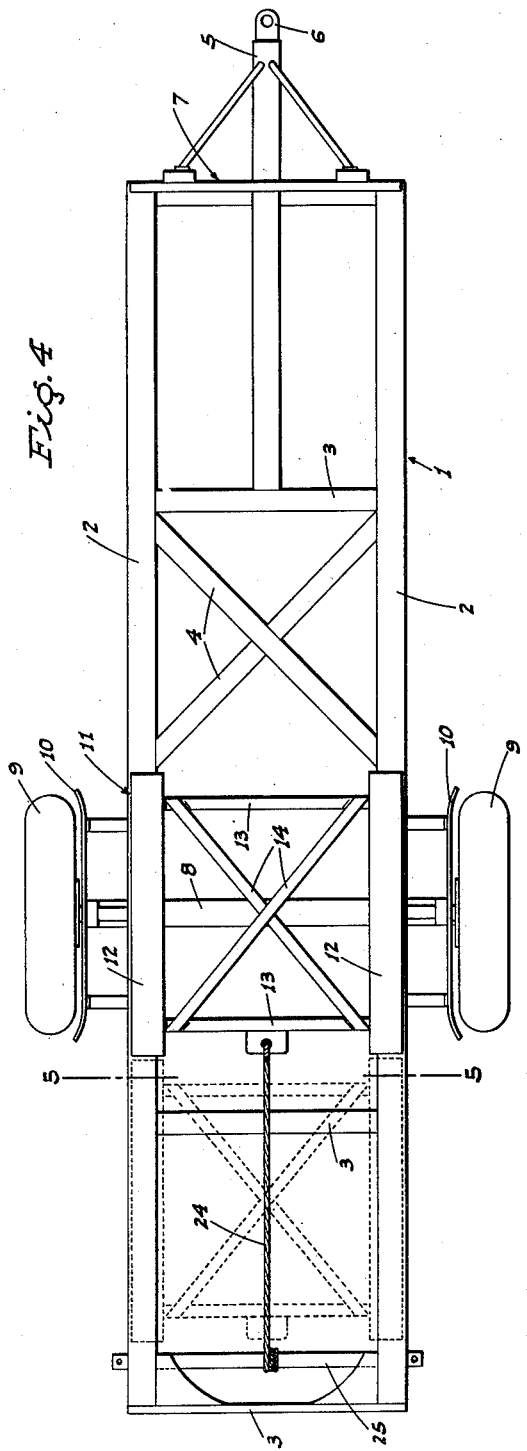
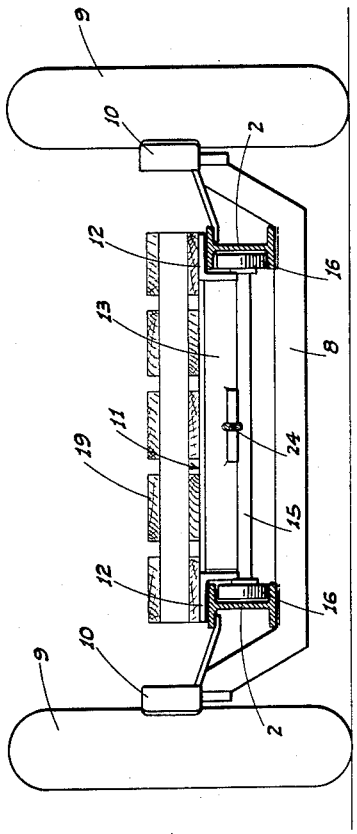
INVENTOR.
L. C. Gross
BY
ATTYS Patented Mar. 6, 1951

2,544,456

UNITED STATES PATENT OFFICE 2,544,456

LOW BED VEHICLE

Leslie C. Gross, Hughson, Calif.

Application December 14, 1946, Serial No. 716,285

3 Claims. (Cl. 214—83.24)

This invention is directed to, and it is an object to provide, an improved low bed vehicle, either as a truck or trailer, particularly designed for transporting loaded fruit or vegetable lug boxes, from point to point as from the field to a cannery.

Another object of the invention is to embody, in combination in a vehicle which includes a low bed extending between transversely spaced supporting wheels below the top thereof, a novel mechanism arranged to facilitate unloading of the portion of the load which is supported between said wheels.

A further object of the invention is to provide a low bed vehicle, as in the preceding paragraph, in which said mechanism includes a lug box supporting carriage normally disposed between the wheels, but mounted on the vehicle for longitudinal movement between said normal position and another position clear of said wheels whereby to permit of easy access to the boxes on the carriage.

The stacks of boxes are usually pallet supported on the vehicle bed to permit of removal by a fork truck at the cannery, and the present invention makes possible the engagement of the fork truck with the pallet which carries the boxes, during transport, between the vehicle wheels.

A further object of the invention is to produce a practical device and one which will be exceedingly effective for the purpose for which it is designed.

These objects are accomplished by means of such structure and relative arrangement of parts as will fully appear by a perusal of the following specification and claims.

In the drawings:

Figure 1 is a side elevation of the low bed vehicle fully loaded.

Fig. 2 is a similar view but shows the rear section of the load removed preparatory to rearward shifting of the carriage and the intermediate section of the load.

Figure 3 is an enlarged fragmentary sectional elevation showing the carriage, with the intermediate section of the load thereon, in its retracted position for ease of access.

Figure 4 is a plan view of the low bed vehicle showing the carriage in its normal or advanced position in full lines, with its retracted position being indicated in dotted lines.

Figure 5 is a cross section on line 5—5 of Fig. 4.

Referring now more particularly to the characters of reference on the drawings, the invention is here shown as embodied in a trailer type vehicle, although it is obvious that such invention may be incorporated in a self-propelled truck or the like The vehicle, as here shown, comprises a low hung, longitudinally extending main frame or bed indicated generally at 1, including a pair of transversely spaced, longitudinal side beams 2 of substantial length. The side beams are I-beams disposed with the flanges thereof top and bottom whereby adjacent channels of said I-beams are in facing relation. The longitudinal side beams 2 are connected together at spaced points by suitable cross members 3 and diagonal bracing 4.

At its forward end the low hung main frame or bed 1 is fitted with a forwardly projecting draft tongue 5, including a hitch 6 for connection to a towing vehicle (not shown). At said forward end the bed 1 includes an upstanding front wall 7 which locates the load and prevents its forward displacement.

Intermediate its front and rear ends the bed 1 is fitted with a transverse under-slung axle 8 having supporting wheels 9 rotatably mounted on opposite ends thereof laterally outwardly of corresponding side beams 2; there being suitable longitudinal guards 10 mounted in protective relation to the wheels 9 between the latter and adjacent side beams 2. The wheels 9 are preferably fitted with pneumatic tires as shown.

A carriage, indicated generally at 11, is mounted on the bed 1 for travel between a normal or advanced position between the wheels 9 and a retracted position rearwardly of said wheels, as shown in full lines and dotted lines, respectively, in Fig. 4. The carriage 11 is constructed and mounted as follows:

The carriage 11 includes a pair of transversely spaced, longitudinally extending side members 12, of angle iron, disposed with one flange thereof riding above the top flange of the corresponding side beam 2. The side members 12 of the carriage 11 are connected together by cross bars 13 and diagonal bracing 14.

Front and rear axles 15 connect between the side members 12, and at opposite ends said axles carry rollers 16 which run in the adjacent and facing channels 17 of the side beams 2.

As so constructed and mounted, the carriage 11 is readily and easily shiftable between its normal advanced position and its retracted position.

When the described low bed vehicle is in use stacks of loaded fruit or vegetable lug boxes 18 are disposed on pallets 19 supported by the bed assembly of said vehicle. The pallet supported load includes a front section 20, an intermediate section 21, and a rear section 22. The box-stack supporting pallets of the front and rear sections 20 and 22 of the load rest transversely of the bed 1 on the side beams 2. The box-stack supporting pallet of the intermediate section 21 of the load is carried by the carriage 11 and extends in supporting relation between the side members 12. As shown, the intermediate section of the load and its pallet are initially or normally between the wheels 9.

The pallets 19 are of the type which include transversely extending openings 23 for the reception of the projecting forks of a fork truck, not shown, such as is commonly used to unload pallet supported stacks of boxes from vehicles at canneries.

When the described low bed vehicle reaches the point of unloading, as at a cannery, the rear section 22 of the load is first removed by the fork truck by engaging its forks with the pallet of said section. The intermediate section 21 of the load, in its normal position, cannot be unloaded by virtue of the obstruction by the wheels 9, and to clear such obstruction said intermediate section 21 is carriage supported, as described. By shifting the carriage 11, with the intermediate section 21 of the load thereon, rearwardly to its retracted position, as shown in dotted lines in Fig. 4, said section of the load is accessible, as also shown in Fig. 3, for engagement and lifting by the forks of the fork truck. If desired, to facilitate movement of the carriage 11 between its normally advanced and retracted positions, a cable 24 is connected between said carriage and a winch bar 25 on the rear end of the bed 1. Upon rotation of the winch bar 25 by a suitable lever or crank, the cable 24 winds onto said bar pulling the carriage 11 rearwardly to its retracted position.

The front section 20 of the load is removed by the fork truck in the usual manner.

With the described low bed vehicle, embodied in either a low bed trailer or truck, a pallet supported section of loaded boxes may be carried, for transport, between the wheels and yet easily and readily moved to an unobstructed position for fork truck removal at the point of unloading.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A vehicle comprising a low, longitudinal bed, transversely spaced wheels supporting the bed on opposite sides and intermediate its ends, the bed being disposed below the high points of the wheels, and means arranged with the bed adapted to normally support a portion of a load between the wheels for transport and for movement lengthwise of the bed to a position clear of the wheels for unloading; said means including a carriage movable along the bed from a normal advanced position between the wheels to a retracted position to the rear thereof, and a cable unit connected between the carriage and rear portion of the bed operative to retract the carriage.

2. A vehicle comprising a low, longitudinal bed, transversely spaced wheels supporting the bed on opposite sides and intermediate its ends, the bed being disposed below the high points of the wheels, and a carriage mounted on the bed adapted to normally support a portion of a load between the wheels for transport and for movement lengthwise of the bed to a position clear of the wheels for unloading; the bed including side beams channeled on adjacent sides, and the carriage including side members disposed in part laterally inward of corresponding side beams, and rollers mounted in connection with the side members and running in said channels.

3. A vehicle comprising a low, longitudinal bed, transversely spaced wheels supporting the bed on opposite sides and intermediate its ends, the bed being disposed below the high points of the wheels, and a carriage mounted on the bed adapted to normally support a portion of a load between the wheels for transport and for movement lengthwise of the bed to a position clear of the wheels for unloading; the bed including side beams channeled on adjacent sides, and the carriage including side members disposed in part laterally inward of corresponding side beams, and rollers mounted in connection with the side members and running in said channels, there being top flanges on the side members overhanging the side beams in adjacent but spaced relation.

LESLIE C. GROSS.

REFERENCES CITED

The following references are of record in the file of this patent:

UNITED STATES PATENTS

| Number | Name | Date |
| --- | --- | --- |
| 48,847 | Smith | July 18, 1865 |
| 431,786 | Thompson et al. | July 8, 1890 |
| 882,407 | Moyer | Mar. 17, 1908 |
| 884,127 | Carroll | Apr. 7, 1908 |
| 1,023,902 | Wehmiller | Apr. 23, 1912 |
| 1,807,268 | Woodruff | May 26, 1931 |
| 1,823,384 | Young | Sept. 15, 1931 |
| 2,061,673 | Robinson | Nov. 24, 1936 |
| 2,290,652 | Russell | July 21, 1942 |